Figure 2:
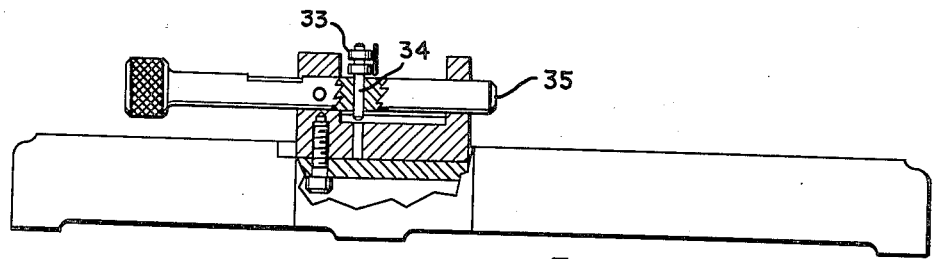

Jan. 24, 1956

L. E. TURNER 2,731,728

GEAR TESTERS

Filed April 9, 1954

2 Sheets-Sheet 1

INVENTOR.
LLOYD E. TURNER
BY
ATTYS.

Jan. 24, 1956     L. E. TURNER     2,731,728
GEAR TESTERS
Filed April 9, 1954     2 Sheets-Sheet 2
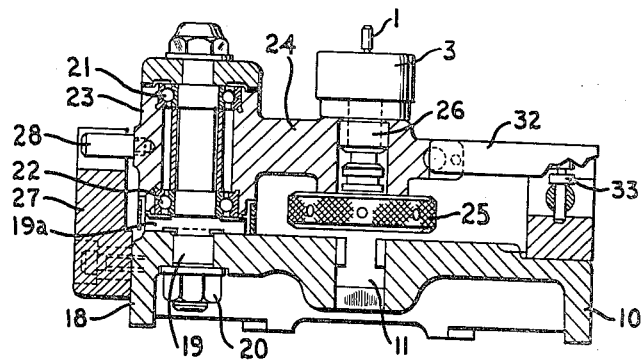
Fig. 4
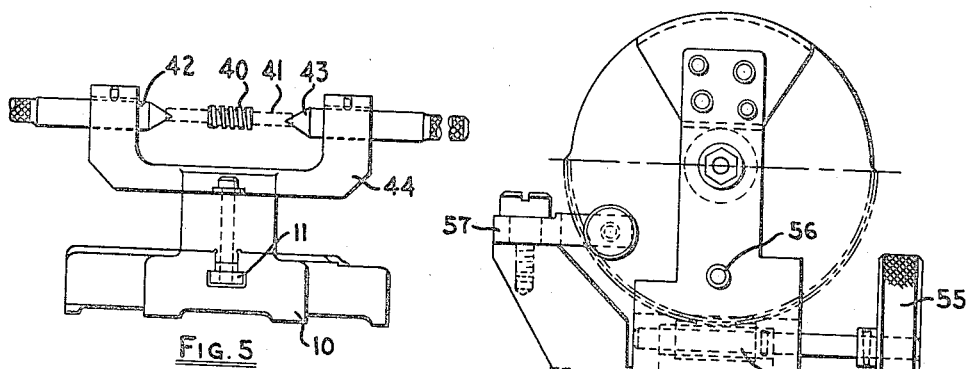
Fig. 5     Fig. 6
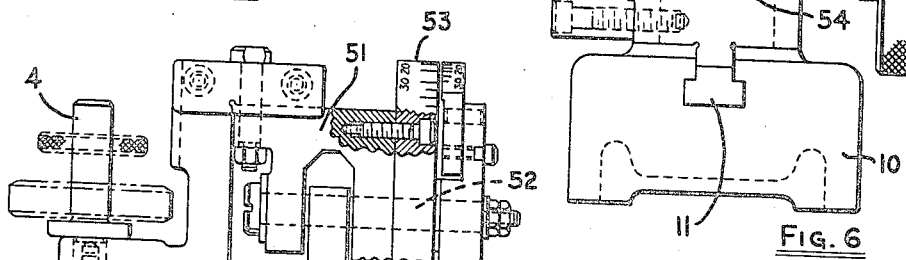
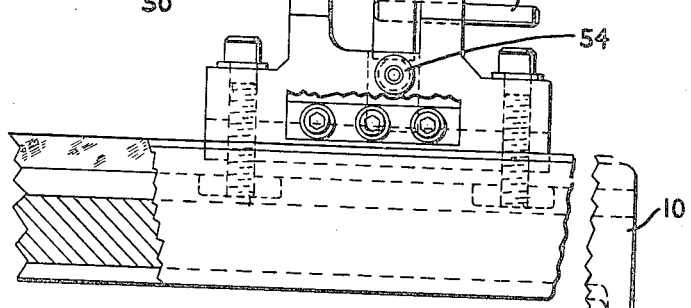
Fig. 7
INVENTOR.
LLOYD E. TURNER
BY
ATTYS.

United States Patent Office 2,731,728
Patented Jan. 24, 1956

2,731,728
GEAR TESTERS

Lloyd E. Turner, Indianapolis, Ind., assignor to the United States of America as represented by the Secretary of the Navy Application April 9, 1954, Serial No. 422,281
1 Claim. (Cl. 33—179.5)
(Granted under Title 35, U. S. Code (1952), sec. 266)

The invention described herein may be manufactured and used by or for the Government of the United States of America for governmental purposes without the payment of any royalties thereon or therefor.

This invention relates to Gear Testers, and is particularly directed to mechanisms for comparing the concentricity of the various tooth circles and tooth contours of an unknown gear with a standard or master gear.

The transmission of motion from one shaft to another always means transmission of power from one point to another even though the amount of power may vary from industrial values to near-zero values. Where, however, the informational content of shaft rotation to be transmitted through gear trains is of paramount importance, the order of tolerances in wheel and tooth dimensions are entirely different from the tolerances usually thought of in the manufacture of power-gears. The tolerances required for testing power-gears has led to techniques unsuited for testing information-gears. For example, equipment for testing automobile differential gears for uniformity comprises arbors for receiving a master gear and a gear to be tested, means for meshing the gears under considerable pressure, and means for indicating the movement between arbor centers as the gears are driven. The fact that the carriage for the movable arbor may travel in tight or sticky ways is of no importance because the pressures and power applied during testing are relatively high. Such a technique is unsuited for testing for the precision contemplated here. For testing gears for information-type gear trains, it has been found that the master gear must be meshed with the gear to be tested under precisely controlled yieldable pressure. The meshing pressure must not only be reproducible from gear to gear, but must be uniform throughout the test for each gear.

The principal object of this invention is an improved gear tester.

A more specific object of this invention is a device for running a gear to be tested enmeshed with a master gear, with means for accurately predetermining the enmeshing pressure.

A still more specific object of this invention is a device for running a gear to be tested enmeshed with a master gear, with means for maintaining the enmeshing pressure uniform throughout the run.

A still further object of this invention is a device for running a gear to be tested enmeshed with a master gear, with means for reliably indicating the variations in distance between the centers of the two gears.

The objects of this invention are attained in a machine having a bed with elongated ways. A first arbor is centered over and carried by the ways, while a second arbor parallel to the first arbor is mounted on a free swinging arm, the center line of the journal for the arm being displaced laterally from the ways and being parallel to the two arbors so that one arbor is free to move in an arcuate path toward and away from the other arbor. The master gear and the gear to be tested are, respectively, placed on the two arbors and a leaf spring extending from the one end of the arm is flexed by an adjustable stop to regulate the enmeshing pressure of the two gears. A plunger type displacement meter is placed in operating contact with the swinging end of the arm to measure movement between the two gear centers.

Figure 1:
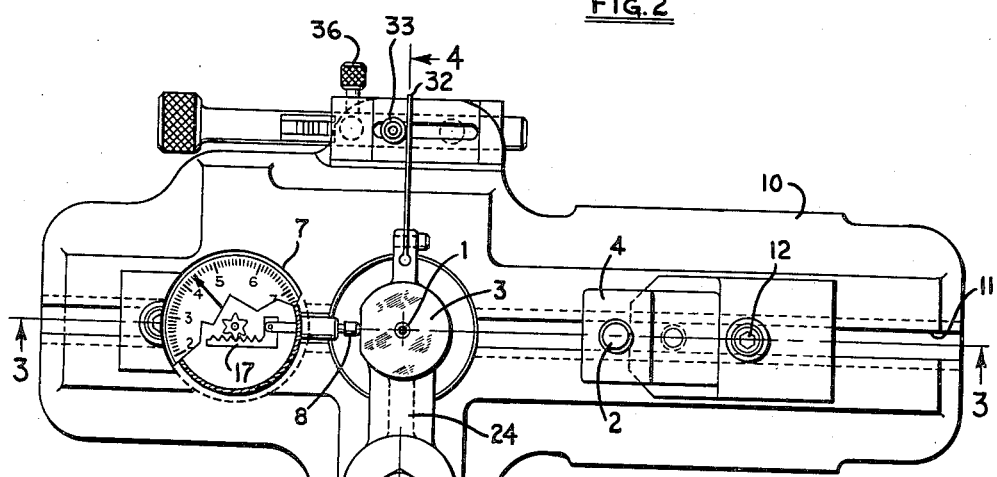
Figure 3:
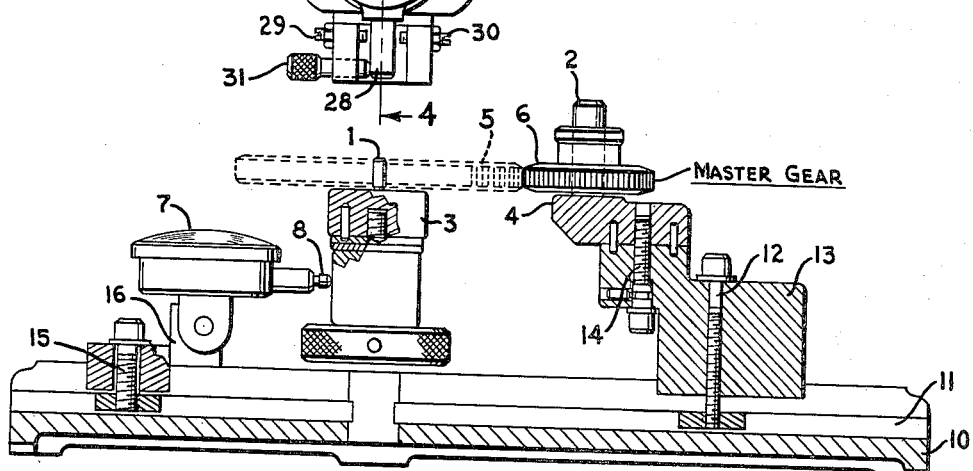

Other objects and features of this invention will occur to those skilled in the art when reference is made to the preferred embodiments described in the following specification and illustrated in the accompanying drawings in which:

Figure 1 is a plan view of the preferred embodiment of the gear tester of this invention, Figure 2 is a partial sectional elevational view of Figure 1, Figure 3 is a view of the gear tester of this invention taken along line 3—3 of Figure 1, Figure 4 is a sectional view of the gear tester taken along line 4—4 of Figure 1, Figure 5 is a detailed view of a worm gear holder attachment for the machine of Figure 1, and Figures 6 and 7 are elevational views of an attachment for adapting a helical gear to the machine of Figure 1.

Referring first to Figures 1 and 3, vertical upstanding arbors 1 and 2 are parallel and extend upwardly from support hubs 3 and 4, respectively. The polished upper surfaces of the hubs from which the arbors extend are held to exact parallelism. On one arbor is placed the gear 5 and on the other arbor is placed the master gear 6. The master gear and the gear being tested may be reversed on the arbors. Each has a center hole accurately machined in diameter to receive its arbor without play, and each has a right angle machined hub face to ride evenly on the upper surface of the support hubs 3 and 4. The master gear and gear to be tested are brought to mesh with a light yieldable pressure determined by means to be hereinafter described. A position indicator 7 with a plunger 8 is brought to bear upon the base of one support hub to indicate the slightest movement of that hub with respect to the other. Since the other hub support 4 is stationary, the dial of the indicator will show variations in distance between arbor centers.

To insure that the enmeshing pressure between the two gears will not vary and hence cause false indications of variable pitch diameter, the support hub 3 is mounted according to this invention upon a support which can move with near-zero friction. Support hub 3 and its mounting with means for accurately determining enmeshing pressure will be described in detail below.

The operating parts of this gear tester are mounted on the bed 10 having a straighter accurately machined longitudinal T-slot or way 11. The overhang flanges of way 11 receive a draw bolt 12 to adjustably clamp the arbor stock 13 in any desired longitudinal position along the way. A stud 14 fixes the support hub 4 to the stock. At the opposite end of the way is a second draw bolt 15 and bracket 16 for adjustably supporting the dial indicator 7. A plane including the center line of the way, the tip of the plunger 8 and the center lines of the arbors 1 and 2 is carefully maintained so that motion between the arbor centers is directly readable without distortion on the dial of the indicator 7. Indicator 7 is preferably of the type which can translate thrust of the plunger 8 into rotary motion for the indicator hand, as by a rack and pinion 17, with or without motion amplification. Commercial indicators can be obtained which will read plunger movements of .0001 inch. Since the stock 13 is longitudinally adjustable, gears with wide ranges of diameters may be placed upon the arbors 1 and 2 for testing. It will be noted no obstruction appears above the upper machined faces of the support hubs 3 and 4.

Intermediate the ends of the bed and laterally to one side of the ways, an integral hub portion 18 of the bed is provided for receiving a king pin 19, Figure 3, staked to accurately stand parallel to the arbors and perpendicular to the arbors and perpendicular to the ways of the bed. To this end the king pin may be turned with a wide flange 19a to seat upon the machined top of the bed, the seating pressure to be made by the threaded nut 20. Widely spaced ball bearing 21 and 22 on the king pin carries the hub 23 and an arm 24 fabricated integrally with the hub. At the outer or free end of the arm is mounted the support hub 3 and its arbor 1. The support hub is removably tightened in place by a knurled hand wheel 25 and threaded stud 26 so that arbors of different sizes may be used. The bearings are preferably adjustable so that all side and end play may be removed and hence so that the upstanding orientation of the arbor 1 will not be disturbed by wear as the arm swings toward or away from arbor 2. The length of the arm 24 and the placement of the hinge pin are so chosen that when the arm 24 is perpendicular to the center line of the way 11, the center line of the arbor 1 lies in the plane including arbor 2 and plunger 8.

To insure that arm 24 may move only through a few minutes of rotation to either side of the mentioned perpendicular position, stops are provided. Conveniently, a bracket 27 is attached to the one side of the bed (see Figures 1 and 4) and straddles at its upper end the lug 28 extending from the hub 23. Two set screws 29 and 30 are threaded in the bracket on either side of the lug to preset the limits of travel of the lug and arm 24. A midposition of the lug is fixed by the thumb screw 31. With such limited motion, as insured by the set screws, the arcuate travel of arbor 1 does not practically deviate from straight line travel in the plane mentioned.

To adjust the enmeshing pressure between the master gear and the gear to be tested the leaf spring 32 is fixedly attached to the arm 24 and is extended substantially in alignment with the arm 24. The outer end of the leaf alignment with the arm 24. The outer end of the leaf spring may be flexed out of said alignment to apply enmeshing pressure to the gears. Conveniently, the outer end of the leaf spring is pressed by rollers 33 carried on a stub shaft 34 which is in turn attached to the calibrated plunger 35. Plunger 35 is slidable lengthwise to the ways and may be fixed in any desired longitudinal position between thumb screw 36. Indicia on the plunger is marked to indicate the deflection pressure in ounces applied at the center of the gear being checked.

All plane surfaces are accurately machined, ground, and polished and the arbors are preferably hardened after machining.

To "set-up" the gear tester of this invention preparatory to comparing two gears, the leaf spring is flexed an amount to obtain the pressure required for testing these particular gears. This pressure is preferably approximately equal to the pressure prescribed by the American Gear Manufacturers Association. For example, a gear .100 wide and with a diametral pitch of 20 to 30 should be meshed with the standard gear under a pressure of 28 ounces, and a gear with a diametral pitch of 50 to 60 would require a pressure of 16 ounces. Diametral pitch is the ratio of the number of teeth to the number of inches of pitch diameter. Then, the thumb screw 31 is adjusted to move the stud 28 midway between the set screws 29 and 30. The arm 24 then strands perpendicular to the ways 11, and the arbor is in the vertical plane through arbor 4. Next, draw bolt 12 is loosened and the stock 13 is shifted by tapping until the distance between center of the arbors is the exact spacing required for the two gears. This spacing between arbors may be measured by gage blocks laid between the arbors, whereupon the draw bolt 12 is tightened. Next the gears are lowered on their respective arbors, and the thumb screw 31 is retracted. Finally, the gear on the stationary arbor 4 is rotated slowly by hand and the behavior of the indicator needle noted. If the needle stands stationary throughout a revolution of the gear under test, the pitch circle is known to be concentric with the center of the gear. If the needle deflects from its zero or starting position as individual teeth are brought into mesh, the thickness of the tooth will be found to be too thick or too thin.

The amount of leaf spring pressure applied to any particular gear to be tested will depend of course upon the width of the gear teeth. As the arbor 1 moves in response to irregularities in individual teeth or in response to eccentricities of the pitch circle of the gear, the indicator will respond. Because of the uniform pressure applied by the springs and the frictionless support of the arbor 1 the wedging action between any pair of enmeshing teeth will be uniform.

Referring to Figure 5, where a worm gear must be matched with a worm, the worm 40 may be mounted upon a mandrel 41, or cut in an integral one-piece round shaft, which is held between centers 42 and 43 mounted in a Y-bracket 44. The Y-bracket and its base portion is so dimensioned and finished that the bracket may replace the support hub 4 of Figure 1. The position of the worm is then in a horizontal plane parallel to the bed and passes through the center of the worm gear, on arbor 1, to which the master worm is to be matched.

Where helical gears must be tested, the arbor carrying the spur master gear must be rotated from the upstanding position of Figure 1 through an angle proportional to the helix of the gear. The arbor 4, in Figure 7, is carried upon a bracket 50 attached to a yoke 51 pivoted on a bolt 52 with a center line through the median point of the enmeshing gears. Coaxial with the bolt 52 on the pivoted yoke may, if desired, be placed a dividing head 53, with graduation marks in degrees and minutes on the head to indicate the helical pitch angle. The technique of placing the master gear and test gear on the arbors, applying the leaf spring pressure, and reading deflections on indicator 7 are the same as with the spur gear apparatus of Figure 1.

A worm drive 54 with hand wheel 55 may be employed for moving the yoke and the arbor 4 supported thereon. A bracket 57 is provided for locking the yoke in any position. A removable dowel pin 56 may be used if desired through aligned holes in the stationary head stock and the pivoted dividing head to index the head to its zero position.

The swinging frictionless arm and the leaf spring on the arm of this invention insures watchmaker-accuracy in testing gears.

What is claimed is:

A gear tester for comparing a first gear with a second gear, said tester comprising a bed with ways, a first arbor adapted to receive one of said gears centered over and carried by said ways, an elongated bearing carried by said bed and displaced laterally from said ways, an arm pivotly mounted at one end on said bearing, a second arbor adapted to receive the other of said gears mounted on the other end of said arm, the second arbor position being substantially centered over said ways; the center lines of said arbors and said bearing being precisely parallel, a leaf spring attached to the arbor-end of said arm and extending beyond the end of the arm to a point laterally of said ways opposite said bearing, a calibrated plunger slidably mounted to said ways, a stub shaft attached to said calibrated plunger, and at least one roller rotatably mounted on said stub shaft and engaging said leaf spring whereby different longitudinal positions of said calibrated plunger change the degree of flexure of said leaf spring.

References Cited in the file of this patent

UNITED STATES PATENTS

| | | |
|---|---|---|
| 1,363,799 | Logue | Dec. 28, 1920 |
| 2,425,381 | Lovick | Aug. 12, 1947 |
| 2,447,445 | Widen | Aug. 17, 1948 |
| 2,540,961 | Osplack | Feb. 6, 1951 |
| 2,588,820 | Gates | Mar. 11, 1952 |
| 2,661,542 | Bean | Dec. 8, 1953 |

FOREIGN PATENTS

| | | |
|---|---|---|
| 111,008 | Austria | Oct. 25, 1928 |